US010476277B2

(12) United States Patent
Maurer

(10) Patent No.: US 10,476,277 B2
(45) Date of Patent: Nov. 12, 2019

(54) TRANSMISSION ARRANGEMENT SUCH AS FOR ENERGY AND/OR SIGNAL TRANSMISSION

(71) Applicant: SMW-AUTOBLOK Spannsysteme GmbH, Meckenbeuren (DE)

(72) Inventor: Eckhard Maurer, Oberteuringen (DE)

(73) Assignee: SMW-AUTOBLOK Spannsysteme GmbH, Meckenbeuren (DE)

( * ) Notice: Subject to any disclaimer, the term of this patent is extended or adjusted under 35 U.S.C. 154(b) by 601 days.

(21) Appl. No.: 14/958,589

(22) Filed: Dec. 3, 2015

(65) Prior Publication Data
US 2016/0164305 A1    Jun. 9, 2016

(30) Foreign Application Priority Data

Dec. 4, 2014    (EP) .................................... 14196366

(51) Int. Cl.
*H02J 5/00*    (2016.01)
*B23Q 1/00*    (2006.01)
(Continued)

(52) U.S. Cl.
CPC ........ *H02J 5/005* (2013.01); *B23B 31/16045* (2013.01); *B23B 31/28* (2013.01);
(Continued)

(58) Field of Classification Search
CPC ..... B23B 31/28; B23B 2260/11; B23B 31/36; H02J 5/005; H02J 7/025; B23Q 1/0009; Y10T 279/27; Y10T 279/13; H04B 5/0037
(Continued)

(56) References Cited

U.S. PATENT DOCUMENTS 3,998,108 A    12/1976   Vyskocil
4,700,936 A *  10/1987   Lunn ........................ B25B 1/18
                                                     269/226
(Continued)

FOREIGN PATENT DOCUMENTS

AT           513629          6/2015
DE           37 27 445       3/1988
(Continued)

OTHER PUBLICATIONS

Non-Contact (Inductive) Couplers; www.balluff.com.*
European Search Report for European Patent Application No. 14196366.0, dated Jun. 1, 2015,4 pages.

*Primary Examiner* — Monica S Carter
*Assistant Examiner* — Mahdi H Nejad
(74) *Attorney, Agent, or Firm* — Foley & Lardner LLP

(57) ABSTRACT

A transmission arrangement such as for energy and/or signal transmission, optionally for use in a machining center, respectively a turning and/or milling center, comprising a clamping unit comprising an outer housing of a preferably cylindrical basic shape, an inner housing received within the outer housing, as well as an inner cylinder held within the inner housing to be adjustable in an actuating direction A, said inner cylinder being configured to transmit a compressive or tensile force for clamping purposes, wherein the inner housing is supported against the outer housing via springs, and is displaceably mounted in the actuating direction A with respect to the outer housing and thus forms a spring force storage, wherein an electric motor is arranged integrated within the clamping unit to apply force in the actuating direction A to the inner cylinder via intermediate gear means, a console having a rotary table mounted therein to be rotatable, at least one first transmission device connected to the console and at least one second transmission device connected to the clamping unit, wherein the clamping (Continued)

unit is releasably fastened on the rotary table, and first and second transmission devices are configured to transmit electrical energy for driving the electric motor in a non-contact, preferably inductive manner between a first transmission device and a second transmission device.

19 Claims, 11 Drawing Sheets

(51) Int. Cl.
*G01P 3/00* (2006.01)
*H02J 7/02* (2016.01)
*H02J 7/04* (2006.01)
*H04B 5/00* (2006.01)
*B23B 31/16* (2006.01)
*B23B 31/28* (2006.01)
*B23Q 1/52* (2006.01)

(52) U.S. Cl.
CPC ........... *B23Q 1/0009* (2013.01); *B23Q 1/522* (2013.01); *G01P 3/00* (2013.01); *H02J 7/025* (2013.01); *H02J 7/042* (2013.01); *H04B 5/0037* (2013.01); *Y10T 279/27* (2015.01)

(58) Field of Classification Search
USPC .................... 279/134; 269/226, 43, 246, 156
See application file for complete search history.

(56) References Cited

U.S. PATENT DOCUMENTS

| | | | |
|---|---|---|---|
| 6,082,010 A * | 7/2000 | Lee .......................... | B23Q 1/38 269/73 |
| 2004/0094910 A1* | 5/2004 | Rehm ............... | B23B 31/16254 279/126 |
| 2009/0080990 A1 | 3/2009 | McMurtry et al. | |
| 2010/0273597 A1* | 10/2010 | Wilson, Jr. ............... | A62B 1/10 475/149 |
| 2011/0155499 A1* | 6/2011 | Wilkes ................. | B62D 5/0409 180/444 |
| 2012/0227886 A1* | 9/2012 | Hsiao ................ | H01L 21/67346 156/60 |
| 2014/0203767 A1* | 7/2014 | Wang ...................... | H02J 5/005 320/108 |
| 2014/0295755 A1* | 10/2014 | Graf ..................... | B23Q 1/0009 455/41.1 |
| 2015/0048565 A1 | 2/2015 | Deininger et al. | |
| 2017/0339515 A1* | 11/2017 | Masakawa ............... | B23Q 3/06 |
| 2018/0369974 A1* | 12/2018 | Kempter ........... | B23B 31/16233 |

FOREIGN PATENT DOCUMENTS

| | | |
|---|---|---|
| DE | 10026829 | * 12/2001 |
| EP | 1 182 006 | 2/2002 |
| EP | 2 837 466 | 2/2015 |
| JP | 02012101315 | * 11/2010 |
| JP | 2011-121148 | 6/2011 |
| WO | WO-2013/023823 | 2/2013 |
| WO | WO2017198600 | * 11/2017 |

* cited by examiner

TRANSMISSION ARRANGEMENT SUCH AS FOR ENERGY AND/OR SIGNAL TRANSMISSION

CROSS-REFERENCE TO RELATED PATENT APPLICATIONS

This application claims the benefit of priority to European Application No. 14196366.0, filed on Dec. 4, 2014, which is hereby incorporated by reference in its entirety.

BACKGROUND

The invention relates to a transmission arrangement such as for energy and/or signal transmission, optionally for use in a machining center, respectively a turning and/or milling center, wherein the transmission arrangement comprises a clamping unit, a console having a rotary table rotatably supported therein, and first and second transmission means according to the features of claim 1 or 2.

In the machining center, workpieces and tools are moved relative to each other in order to machine a workpiece clamped on the machine table. Connecting a clamping means, including a chuck for clamping a tool or a workpiece to a power supply or a machine control unit via a plug connection is known from the prior art. Apart from plug connections, sliding contacts are also known for rotary chucks which are, however, subject to heavy wear and tear due to their functioning principle. A connection via plugs is only possible when the chuck is at standstill, the degrees of the clamping means' freedom of motion otherwise being strongly limited in rotary operation.

SUMMARY OF THE INVENTION

It is therefore a task of the present invention to provide a transmission arrangement such as for energy and/or signal transmission, optionally for use in a machining center, respectively a turning and/or milling center which enables best possible freedom of movement when machining the tool. The transmission arrangement should be optionally suitable for transmitting energy and/or signals between rotary components of a machining center. Optionally, the transmission arrangement should increase the operational safety and machining precision by monitoring and/or controlling a clamping unit during a machining operation. The transmission arrangement should in addition guarantee highest possible flexibility, good accessibility and simple operability when clamping a workpiece or tool. Preferably, it should not be necessary to specifically adapt a transmission arrangement to a certain machining center, certain workpieces or a certain tool.

This task is solved by a transmission arrangement according to claim 1 or 2.

The task is solved optionally by a transmission arrangement such as for energy and/or signal transmission, optionally for use in a machining center, respectively a turning and/or milling center, comprising the following:
- a clamping unit comprising an outer housing of a preferably cylindrical basic shape, an inner housing received within the outer housing, as well as an inner cylinder held within the inner housing to be adjustable in an actuating direction A, said inner cylinder being configured to transmit a compressive or tensile force for clamping purposes,
- wherein the inner housing is supported against the outer housing via springs and is displaceably mounted in the actuating direction A with respect to the outer housing and thus forms a spring force storage,
- wherein an electric motor is arranged integrated within the clamping unit to apply force in the actuating direction A to the inner cylinder via intermediate gear means,
- a console having a rotary table mounted therein to be rotatable,
- at least one first transmission device connected to the console, and
- at least one second transmission device connected to the clamping unit,
- wherein the clamping unit is releasably fastened on the rotary table, and first and second transmission devices are configured to transmit electrical energy for driving the electric motor in a non-contact, preferably inductive manner between a first transmission device and a second transmission device.

Due to the clamping unit, the inner cylinder may be displaced along the actuating direction A which optionally coincides with the axial longitudinal direction of the clamping unit which is preferably of a cylindrical design. Thereby, a clamping force is applied, for instance, by a chuck constructed on top of the clamping unit for fixing a workpiece or tool. A spring force storage is realized insofar as a displaceable inner housing is supported via springs against the outer housing of the clamping unit while being displaceably mounted in the actuating direction A with respect to the outer housing. Furthermore, the electric motor is arranged to be integrated within the clamping unit, preferably enclosed by the outer housing, further preferentially received within the inner housing. The electric motor drives gear means so as to apply force to the inner cylinder in the actuating direction A. The gear means are arranged optionally to be integrated within the clamping unit, preferably enclosed by the outer housing, further preferentially received within the inner housing. This combination creates a structurally compact, universally applicable, reliable and easy to use clamping unit which can be employed, for instance, in a machining center, respectively a turning and/or milling center, even for rotating operation. The clamping unit could be used both for clamping a tool, e.g. in a spindle head, or for clamping a workpiece, e.g. on a machine table.

The term "console" may generally be understood as a basic structure for a machine table of a machining center, e.g. a turning and/or milling center. A machine table may be movable translationally and/or rotationally and may comprise, respectively form a rotating table or rotary table. The console is not required to be designed spatially stationary but may also be mounted, for example on a cross-slide, to be axially displaceable or tiltable in one or more directions optionally with respect to the horizontal.

A rotary table is rotatably mounted to be in the console and allows rotation of the clamping unit when same is attached to the rotary table. The clamping unit may be releasably attached on the rotary table in a force-fitting manner by a fastening flange, for example, via screws and corresponding T-slots or trapezoid slots in the surface of the rotary table. In the attached state of the clamping unit, the central axis of the optionally rotationally symmetric clamping unit preferably coincides with the rotation axis of the rotary table. The clamping unit may be moved, optionally together with a chuck placed on top and connected, by a rotation of the rotary table and possibly an additional displacement, respectively tilting of the rotary table, for instance by means of the console.

The rotation of the rotary table at least temporarily generates a relative movement, optionally a relative rotation between the clamping unit and the console. The rotary table could rotate relatively slowly, on the one hand, in order to position a clamped workpiece appropriately for machining by a rotating tool, for example, or rotate relatively quickly in order to move a clamped workpiece relative to a stationary tool, for example. The clamping unit can thus sequentially perform a plurality of rotations together with the rotary table or only turn in sections, respectively parts relative to the console, e.g. in different directions. In principle, it is conceivable for the rotary table to be driven via the spindle of a machine tool optionally of a turning and/or milling center.

The transmission arrangement comprises a first transmission device and a second transmission device cooperating with each other in a non-contact, preferably inductive manner, e.g. are inductively coupled. The first transmission device is connected to the console, whereas the second transmission device is connected to the clamping unit. The transmission devices may each be releasably fastened to the console, respectively clamping unit, and optionally even be received in same entirely or partially. The term "connection" may be understood both as an electrotechnical connection in terms of a current and/or signal line and a mechanical connection in terms of a fixed, respectively rigid attachment. Optionally, a first transmission device is fixed in the console's reference system, while a second transmission device is fixed in the clamping unit's, respectively rotary table's reference system, thus can move, e.g. rotate relative to the first transmission device. In this respect, the second transmission device represents a rotor and the first transmission device a stator. The transmission devices may each be comprised of several components. Several transmission devices may be combined, respectively integrated into a single, optionally superordinate transmission device. The inventive first and second transmission devices allow non-contact energy and/or signal transmission, respectively coupling for transmission purposes both with a clamping unit being idle or rotating.

Electrical energy, respectively power for driving the electric motor is preferably transmitted e.g. from an external current source outside the transmission arrangement through a first transmission device to a second transmission device. The electric motor preferably is a direct current motor but may also be realized as an alternating current motor or optionally as a servomotor.

Non-contact transmission of electrical energy for driving the electric motor integrated within the clamping unit guarantees a highest possible freedom of movement for machining a workpiece, since cable connections or plug connections, for instance, are not required to be provided on the clamping unit which could, for example, undesirably entangle or restrict the clamping unit's degrees of motion freedom. When a machining center is set up, e.g. a workpiece or tool is clamped, great flexibility, good accessibility and simple operability is achieved when impeding cables and connections are not present.

The gear means, for instance, comprise a sleeve screw drive or a planetary roller screw drive to translate rotational movement of the electric motor into an axial loading of the inner cylinder. Advantageously, the gear means comprise a worm gear having a worm provided at the motor side and a worm wheel provided at the output side. Further advantageously, the worm wheel is connected to a first internally threaded partial element of the sleeve screw drive or the planetary roller screw drive in a torque-locked manner and optionally realized integrally with same. As is known, a worm gear allows a high reduction ratio to be effected. When the worm gear is at the same time intermeshed with the sleeve screw drive or the planetary roller screw drive, the worm wheel consequently is formed at an external peripheral surface of the sleeve screw drive's or planetary roller screw drive's first partial element, then rotational movement of an electric motor can be converted into axial movement of the inner cylinder with few constructional parts. The worm wheel advantageously comprises a circumferential upper bearing surface as well as a circumferential lower bearing surface via which it is supported, preferentially via balls, against the inner housing in radial and/or axial direction.

So that the clamping unit can be realized of a relatively flat construction, it is preferred for the electric motor to exhibit an output shaft which is oriented orthogonal to the inner cylinder's actuating direction A. When a worm gear will be provided, it is preferred from similar considerations to also orient the worm in an axis S extending orthogonal to the actuating direction A. Finally, with regard to a compact design of the clamping unit when a worm gear will be provided, rather than connecting the worm directly to the electric motor's output shaft axially, it may be advantageous to arrange the worm orthogonally to the electric motor's output shaft. A torque-locked transmission of the output shaft's rotary movement to the worm may, for instance, ensue via a pinion gear arranged in between.

Advantageously, the inner cylinder exhibits at least one portion, preferably a distal portion of a cross-sectional shape, optionally elliptical cross-sectional shape, deviating from the rotational shape so as to lock the inner cylinder relative to the outer housing in non-rotating manner. Specifically, the inner cylinder of elliptical cross-sectional shape may, for instance, be passed through an opening in the outer housing of a corresponding elliptical cross-sectional shape so that the desired non-rotating locking is hereby effected.

The task is optionally solved by a transmission arrangement such as for energy and/or signal transmission, e.g. having the features of claim 1, comprising the following:

a clamping unit comprising an outer housing of a preferably cylindrical basic shape, an inner housing received within the outer housing, as well as an inner cylinder held within the inner housing to be adjustable in an actuating direction A, said inner cylinder being configured to transmit a compressive or tensile force for clamping purposes, wherein the inner housing is supported against the outer housing via springs and is displaceably mounted in the actuating direction A with respect to the outer housing and thus forms a spring force storage, wherein an electric motor is arranged integrated within the clamping unit to apply force in the actuating direction A to the inner cylinder via intermediate gear means, a console having a rotary table mounted therein to be rotatable, at least one first transmission device connected to the console, and at least one second transmission device connected to the clamping unit, wherein the clamping unit is releasably fastened on the rotary table and comprises sensor devices, and wherein first and second transmission devices are configured to transmit signals generated by the sensor devices in a non-contact, preferably inductive manner between a first transmission device and a second transmission device.

The above-cited advantageous and optional configurations of the clamping unit, console, and rotary table and transmission devices apply accordingly for the transmission arrangement according to this aspect of the invention which is described below.

The clamping unit comprises sensor devices which may be arranged integrated within the clamping unit, preferably enclosed by the outer housing, further preferentially received within the inner housing. A sensor device optionally comprises a sensor which, for instance measures force, a displacement path or a rotational speed or detects a certain state and generates a corresponding sensor signal. Such a sensor may be based on many different physical principles. The sensor devices are optionally connected in a signal-conducting manner to the second transmission device. A first and/or second transmission device may comprise components for interpreting, processing or evaluating the signals, e.g. measurement and/or status signals of the sensors.

Signals, optionally electrical signals are transmitted in a non-contact, for instance capacitive or preferably inductive manner between the first and second transmission devices. Preferably, signals are transmitted from a second transmission device to a first transmission device. For example, a locking status of a clamping unit, respectively a chuck, the clamping force currently actually applied to a workpiece, or a travel path of the clamping unit along actuating direction A may be detected by the sensor device, corresponding signals be generated and conducted to a second transmission unit, be transmitted in a non-contact manner to a first transmission device and forwarded to a machine control unit of the machining center. However, a signal transmission may also be realized in opposite manner, for instance as a sensor device control, or in both directions e.g. simultaneously. Yet, a signal transmission the other way round for driving the sensor means, for instance, or e.g. simultaneously in both directions, may also be realized. A sensor device can in each case have a certain first and a certain second transmission device allocated which transmit a certain signal. However, it is also possible to transmit different signals generated by different sensor devices between a first and a second transmission device.

Optionally, signals generated by sensor devices may be light signals. Sensor signals may also be transmitted in the form of light in a non-contact manner between first and second transmission devices. Sensor devices may be provided which generate light signals. First and/or second transmission devices may comprise conversion components which convert electrical measurement signals into light signals or vice versa. A transmission device, e.g. the second transmission device could have a light source, e.g. a laser or an LED and/or an optical fiber, respectively fiber optic cable, for example, so as to send the output light signal in a non-contact manner via a transmission gap to a transmission device, e.g. the first transmission device. A first transmission device could receive the light signal, for instance by means of a photo cell, and forward a corresponding, e.g. electrical signal to an evaluating or processing or machine control unit. The first transmission device, however, could also couple received light signals into an optical fiber and forward the signal as a light signal. A plurality of parallel optical fibers and correspondingly a plurality of receiving units such as photo cells may be provided so as to optionally transmit different sensor signals at the same time. Yet it is also conceivable for different sensor signals to be transmitted in temporal succession, such as periodically, using one single optical fiber. Advantageously, an optical fiber may extend along the axis of rotation, respectively be arranged thereon.

Non-contact transmission of signals guarantees a highest possible freedom of movement for machining a workpiece, since cable connections or plug connections, for instance, are not required to be provided on the clamping unit which could, for example, undesirably entangle or restrict the clamping unit's motion freedom. Furthermore, the non-contact signal transmission allows monitoring and/or driving of a stationary or moving, e.g. rotating clamping unit to be performed during a machining operation and thereby increasing both the machining precision and operational safety.

According to a further aspect of the invention, first and second transmission devices may be configured to transmit both electrical energy for driving the electric motor and signals generated by sensor devices in a non-contact manner. Preferably, electrical energy for supplying the sensor devices is also transmitted in non-contact manner between the transmission devices.

The transmission safety of the transmission arrangement may be further increased by disposing the transmission devices outside the working range of a machining center, for instance in a protected inner area around the axis of rotation, preferably between, respectively in the rotary table and the console. Chips arising during machining or discharged cooling liquid, e.g. cannot negatively impact the functioning of transmission devices arranged in such a protected manner. The operational safety and efficiency may also be increased by transmission devices functioning in a non-contact manner and being protected, since plug connections are not required to be connected, for instance manually plugged in, cannot be contaminated or damaged, and consequently do not require intensive maintenance, respectively cleaning. This has important benefits in particular for automated clamping operations.

In an advantageous further development of the invention, a rechargeable battery such as a lithium ion battery is arranged integrated within the clamping unit. Electrical energy such as for charging and/or discharging the rechargeable battery can be transmitted in a non-contact, preferably inductive manner between a first transmission device and a second transmission device. The rechargeable battery preferably is arranged to be enclosed by the outer housing, further preferentially received within the inner housing. A plurality of rechargeable batteries may also be integrated within the clamping unit. The rechargeable battery can feed electrical energy to the electric motor. In the event of high power consumption by the clamping unit, for instance during a clamping process, both electrical energy from the rechargeable battery as well as electrical energy transmitted in a non-contact manner to a second transmission device may be provided for driving the electric motor. The percentage of electrical power provided in the clamping unit from the rechargeable battery or through the inductive transmission, e.g. for driving the electric motor, may vary depending on the rechargeable battery's capacity and charging state as well as the specific design of the first and second transmission device. At a clamping power of 1.5 kW, for example, between 500 and 700 W could be inductively transmitted into the clamping unit and the differential amount be fed from the rechargeable battery. At times when the electric motor is not in use, the rechargeable battery may be charged or discharged in a non-contact manner even with a rotating clamping unit. A rechargeable battery has the advantage that energy-intensive, respectively power-intensive clamping operations for a production process such as workpiece or tool replacement may even be performed by the clamping unit within an economically acceptable time, and at the same time the clamping unit's degrees of motion freedom are maintained by the non-contact charging of the rechargeable battery via the transmission devices.

In an advantageous further development of the invention, first and second transmission devices exhibit primary, respectively secondary coils, optionally each cooperating in pairs so as to transmit electrical energy from a first transmission device to a second transmission device and/or sensor signals such as locking, unlocking, force, path and/or speed signals from a second transmission device to a first transmission device optionally in an inductive manner. For transmitting electrical energy, e.g. for driving the electric motor, a current delivered by an external current source is passed through a primary coil arranged in the first transmission device. A current which is used to drive the electric motor is induced in a secondary coil arranged in a second transmission device. A second transmission device, for example, exhibits a primary coil for transmitting an electrical sensor signal, with a corresponding signal being induced at a second transmission device exhibiting a secondary coil. It is conceivable to arrange several primary and/or secondary coils, each being able to transmit different signals or electrical energy, in a first or second transmission unit. The primary and/or secondary coils as well as further components of the first and second transmission devices preferably are configured such that that they are protected, respectively shielded from interfering influences. In machining a workpiece, for example, incidental chips, discharged cooling liquid or incidental vibrations should not be able to affect the transmission devices' transmitting function. This may on the one hand be achieved by arranging the two transmission devices in protected manner in an internal area of the rotary table or the console. On the other hand, the transmission devices themselves may be realized such that coils are, for example not mounted, respectively installed in exposed manner in the first and second transmission devices but rather in a cased, sealed or isolated manner.

In an advantageous further development of the invention, a second transmission device is arranged eccentric to a central axis of the clamping unit, optionally laterally to the outer housing at, respectively within the clamping unit. The central axis optionally coincides with the longitudinal axis of the clamping unit having a cylindrical basic shape which in turn coincides with the rotary axis of the rotary table and the actuating direction A of the inner cylinder when the clamping unit is correspondingly fastened on the rotary table. A second transmission device arranged to be eccentric defines in this case a circular orbit around the rotary axis when the clamping unit rotates. An optionally stationary first transmission device may be arranged with respect to this circular orbit such that during a time interval of one revolution, the first and second transmission devices are facing at least in some sections such that a transmission gap develops between them via which inductive coupling is enabled. The first and/or second transmission device(s) may have for example the shape of a circular ring segment. Several second transmission devices may be distributed across the clamping unit's circumference, e.g. for transmitting different signals or electrical energy.

In an advantageous further development of the invention, a second transmission device is arranged on the clamping unit coaxial to a central axis of the clamping unit, optionally below same, preferably at a lower outer housing element. Optionally, a first transmission device may be arranged coaxial to the second transmission device. Non-contact transmission of electrical energy and/or signals may then be realized via front surfaces and/or circumferential surfaces. In this case, the inductive coupling may ensue independent of the rotary table's position, e.g. across the entire circumferential surface of the second transmission device.

Alternatively, a first transmission device may be arranged eccentric to a central axis of the clamping unit, wherein the coupling with the second transmission device is then only possible across a part of the second transmission device's circumference.

Due to a coaxial mounting of the second transmission device, same performs a pure rotation and is always arranged, at least over a part of its circumference, facing the first transmission device so that continuous coupling can be realized. This is particularly advantageous when the rotary table, respectively the clamping unit is not or only slowly rotating. A high transmission rate, respectively reliability may thereby be achieved.

In an advantageous further development of the invention, the first transmission device and the second transmission device preferably have circular or annular front surfaces between which an optionally axial transmission gap is formed. For example, first and second transmission devices are oriented to be coaxial to each other and form front surfaces e.g. parallel to each other which are oriented perpendicular to the rotary axis of the rotary table, respectively the longitudinal axis of the clamping unit. In a horizontal orientation of the rotary table, an axial transmission gap extends in horizontal direction between the front surfaces. The front surfaces may also only constitute sectors of circles or rings. A front surface may be configured to be stepped or slanted. In this case, a front surface may be subdivided into different sectors or sections, each allocated to different transmission devices so that different signals and/or electrical energy can be transmitted via one front surface.

In an advantageous further development of the invention, the first transmission device and the second transmission device have circumferential surfaces between which an optionally radial transmission gap is formed. For example, first and second transmission devices are at least partially arranged within each other, wherein both the first as well as the second transmission device can be arranged inside or outside. A radial transmission gap then extends between an inner and an outer circumferential surface of the first, respectively second transmission device e.g. in vertical direction when the rotary table is in horizontal orientation. The radial transmission gap may develop in some sections or over the entire circumference. In the event of inductive coupling across a circumferential surface, the transmission surface may be adjusted by adapting the axial overlapping zone of the first and second transmission devices.

In an advantageous further development of the invention, a single first transmission device and a single second transmission device are provided to transmit electrical energy for driving the electric motor, electrical energy for charging and/or discharging the rechargeable battery and/or at least one sensor signal. A single transmission device may be given by, for example, structurally combining individual transmission devices assigned to single signals or the transmission of electrical energy. Due to an integration of various transmission devices, the transmission arrangement is constructed in a simple and compact manner with defined coupling interfaces for transmitting specific signals or electrical energy.

In an advantageous further development of the invention, the first and/or second transmission device(s) (has) have a rotation-symmetrical, preferably circular cylindrical basic shape. Optionally, in a mutual coaxial arrangement of the first and second transmission devices, first and second transmission devices of circular cylindrical basic shape form circular or annular front surfaces or lateral surfaces and enable the transmission at a constant width of a transmission gap. So doing guarantees a reliable and continuous coupling between the first and the second transmission device.

In an advantageous further development of the invention, the first transmission device has an axially extending transmission shaft in which a plurality of lines for guiding electrical energy and/or sensor signals, for example cables or a bus system, are arranged. The transmission shaft preferably has a smaller diameter than a front surface of the first transmission device. The transmission shaft is optionally securely mounted, e.g. inserted in the console, wherein the transmission shaft preferably includes terminals at its lower end for connecting the lines to an external power supply and/or a machine control unit.

In an advantageous further development of the invention, the rotary table is driven by a hollow shaft into which the first transmission device, optionally the transmission shaft protrudes. Arranging the transmission shaft at least partially within the hollow shaft enables achieving a coaxially oriented design of the first transmission device with the rotary axis of the rotary table. In this way, a coupling of the first and second transmission devices via front and/or circumferential surfaces is possible in compact design.

In an advantageous further development of the invention, the rotary table has a central, preferably circular cylindrical recess into which the first transmission device and/or second transmission device(s) protrude, respectively protrudes. The second transmission device is, for example, arranged at a lower outer housing element of the clamping unit and, in the clamping unit's fastened state on the rotary table, enters into the recess. Optionally, the recess is configured such that a passage is given from the upper side of the rotary table to the first transmission device.

In an advantageous further development of the invention, the width of the transmission gap is between 0.1 mm and 10 mm, preferably between 0.5 mm and 5 mm, and particularly preferred about 1 mm. The transmission gap, e.g. air gap formed in this manner guarantees a good inductive coupling between the front, respectively circumferential surfaces of the first and second transmission devices. Sufficiently high enough power for driving the electric motor and signals may thereby be transmitted without contact in a reliable and interference-free manner.

In an advantageous further development of the invention, the sensor devices and the second transmission devices are connected to each other in a signal-conducting manner, e.g. via cables guided through openings in the outer and/or inner housing(s). It is conceivable for the second transmission device to be received, respectively integrated within the clamping unit's outer housing such that no lines lead out from the outer housing. Sensor devices may be mounted in the outer housing so as to detect e.g. a relative displacement, respectively the displacement position of the inner housing relative to the outer housing. Sensor devices may also be received within the inner housing in order to detect rotational movements of the gear means or the electric motor, for example. Sensor devices may also be arranged between the outer and the inner housings, e.g. in the area of the spring force storage, for example for measuring an effective spring force. Corresponding passage openings in the inner housing may facilitate a signal-conducting connection of the sensor devices to the second transmission device.

In an advantageous further development of the invention, the inner housing is supported against the outer housing via a plurality of springs of different constructional design such as via one or more spiral springs and via one or more gas pressure springs. In this constructional design, the spring characteristics of the cited different springs combine with each other in a synergistic manner. While a spiral spring provides only a small counterforce upon a small displacement but provides a high counterforce at high displacement paths, a gas pressure spring generates a relatively high counterforce at even just small displacement paths. If the spring characteristics of both springs of different constructional design are now superimposed in that they are placed parallel to one another such as side by side based on their mode of action, thus from the functional point of view, then a total spring characteristic ensues which provides a relatively high counterforce even at just small displacement paths, this counterforce even increasing at higher displacement paths due to the spiral springs' action then coming into effect. The combination of spiral and gas pressure springs offers the advantage that, when the clamping unit needs to "re-clamp" at low forces, the clamping force does not or only negligibly decreases over the reclamping path. "Re-clamping" in this context is to be understood in particular as an application of a clamping force from a spring force storage when, for example due to vibrations or a slight deformation of a clamped workpiece during machining, a slight displacement of the inner cylinder occurs which is referred to as "re-clamping path." In particular when clamping forces are adjusted low, for example because a workpiece is susceptible to deformation, the inventive combination of spiral and gas pressure springs, e.g. due to the characteristic of a pas pressure spring, can prevent the loosening of the clamping or even the detaching of the workpiece.

In an advantageous further development of the invention, an arresting device is provided to arrest the gear means if required, optionally in the electric motor's rest position. Although in a corresponding configuration of the worm gear, arresting may already be yielded by the worm gear itself, for safety reasons or in a configuration of the worm gear effecting no arresting, the arresting e.g. in the electric motor's rest position, however, effects particularly high reliability to the generating of a clamping force and that input in the spring force storage is not lost due to the gear means undesirably resetting.

In a specific configuration, the arresting device may comprise an axially displaceable pin which may be engaged with, respectively disengaged from an arresting recess in the associated gear means, optionally a shaft extension of the worm via an actuating device. Such an axially displaceable pin effects secure arresting since it only needs to be kept in the locking position but not permanently under application of a holding force. The actuating device for displacing the axially displaceable pin may be formed as an electromagnetic actuator which is able to displace the pin from a first position into a second position, respectively from a second position into a first position and can be driven by a signal in a non-contact manner via the first and second transmission devices. If need be, the axially displaceable pin may also be urged in the direction of the locking position by a spring in such a manner that the actuating device is only driven when the electric motor, respectively the gear means is actuated so as to transition the axially displaceable pin from the locking position into a releasing position against the spring's urging action. Once the displacing movement of the clamping cylinder is completed via the electric motor and the gear means, the actuating device may allow the pin to slide back again into the locking position under the action of the cited pin.

In an advantageous further development of the invention, the sensor devices comprise arresting sensor means. The arresting sensor means are configured and intended to check whether an arresting device is in arresting position and to send a corresponding lock or unlock signal to the second transmission device. When the arresting device comprises an axially displaceable pin, the arresting sensor means can specifically check the position in which the axially displaceable pin is in. A locked state, consequently in particular the state of locked gear means, or an unlocked state, consequently in particular the state of unlocked gear means, of the clamping unit may be detected therefrom and a corresponding lock or unlock signal generated by the arresting sensor means.

The sensor devices may further comprise such sensor devices which are configured and intended to detect the adjustment position of the inner housing within the outer housing and/or the counterforce stored in the spring force storage, and to send a corresponding path and/or force signal to the second transmission device. The counterforce stored in the spring force storage may also be detected indirectly via the adjustment position of the inner housing, e.g. via a known force-spring characteristic of the spring force storage. A path signal may depend on the clamped workpiece or the chuck placed on top, for example, whereas a force signal allows a direct conclusion to be drawn about the actually applied clamping force.

The sensor devices may further comprise such sensor devices which are configured and intended to detect the rotary movement of the electric motor, an output shaft and/or the gear means, optionally the respective number of revolutions, and to send a corresponding, optionally incremental speed signal to the second transmission device.

The second transmission device receives for example a lock signal, an unlock signal, a force signal, a path signal and/or speed signals and transmits same in a non-contact, optionally inductive manner to the first transmission device. A selection, an arbitrary combination of the cited sensor signals or a plurality of further sensor signals may be transmitted in a non-contact manner. Preferentially, two status signals such as PLC (programmable logic control) signals which are digital signals, and two measurement signals which are e.g. analog signals are received by the second transmission device, processed and transmitted to the first transmission device. The measurement signals are, for example, signals of a linear position sensor, e.g. of from 0 to 10 V or 4 to 20 mA, while the status signals e.g. are a lock and an unlock signal of e.g. 0 or 24 V. The first transmission device is optionally configured to transmit a DC voltage for driving and supplying the electric motor, for example of between 48 and 150 V, and/or a DC voltage for driving and supplying the sensor means, for example of 24 V, to the second transmission device. The cited voltage values are mere examples and illustrate only the transmissibility of different signals. The transmitted signals are in addition processed and evaluated in a signal processing unit so as to be able to analyze, respectively monitor the clamping unit's state, optionally of the arresting and of the spring force storage. The first transmission device represents an interface to a machine control unit such as a PLC.

In a preferred configuration, the inner housing is configured to comprise a basic housing element as well as a housing cover attached to each other by connecting elements. In this configuration, it becomes particularly simple to mount the clamping unit, e.g. the inner housing including the components received, respectively supported in it, such as worm gear, sleeve screw drive including the accommodated inner cylinder, electric motor including pinion drive, springs, sensor devices and rechargeable battery.

BRIEF DESCRIPTION OF THE DRAWINGS

The invention will be described hereinafter also with respect to further features and advantages on the basis of the description of exemplary embodiments and with reference to the attached drawings. Hereby shown are.

DETAILED DESCRIPTION

Figure 1:
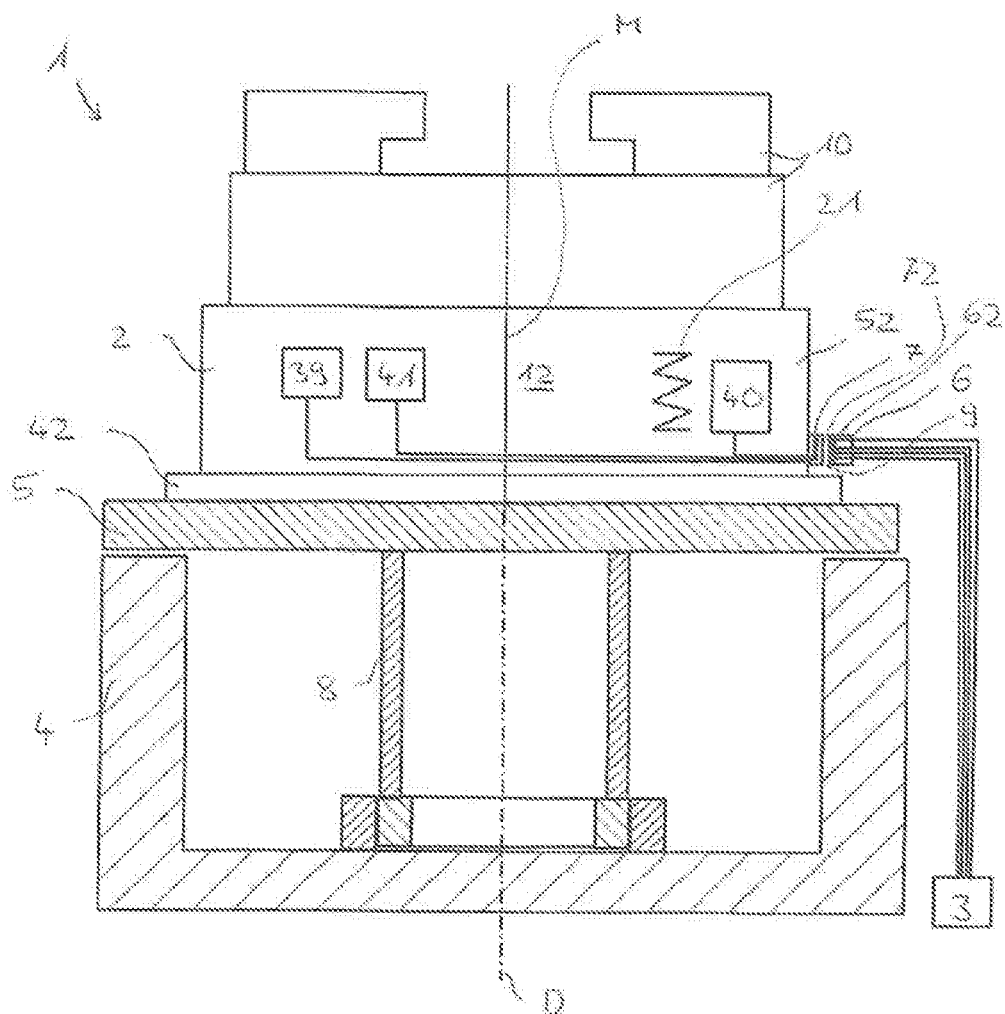
FIG. 1 a first embodiment of the inventive transmission arrangement with eccentrically arranged transmission devices in a schematic representation.

FIGS. 1-4 each show an embodiment of the inventive transmission arrangement in a schematic representation, with the configuration and arrangement of the first and second transmission devices 6, 7 each being different in FIGS. 1-4. An inventive transmission arrangement 1 comprises a clamping unit 2, a console 4, in which a rotary table 5 is rotatably mounted, as well as a first transmission device 6 and a second transmission device 7. Further details for the optional implementation of the clamping unit 2 will be explained below in conjunction with FIGS. 6, 7 and 8. Here, the clamping unit 2 is implemented as an understructure cylinder which is releasably fastened on the surface of a rotary table 5 by a fastening flange 42, for example via screw connections or via several intermediate columns configured with suitable adapter elements for releasably fastening the fastening flange 42 to the rotary table 5. The rotary table 5 rotates, respectively turns relative to the console 4 which may be spatially stationary or axially displaceable and/or tiltable via slides along, respectively about one or more axes. The first transmission device 6 is fixedly connected to the console 4 and represents a stator at least with respect to the console 4. A second transmission device 7 is connected to the clamping unit 2 and, due to the mounting thereof on the rotary table 5, constitutes a rotor. The first transmission device 6 and the second transmission device 7 are thus arranged to be pivotable relative each other about the rotary axis D of the rotary table 5. Various, principally different embodiments are conceivable in this respect (see FIGS. 1-4). Electrical energy for driving an electric motor 16 which is integrated into the clamping unit 2 can be transmitted between the first transmission device 6 and the second transmission device 7 in a non-contact, optionally inductive manner. Alternatively or additionally, sensor signals generated by sensor devices 39, 40, 41 integrated into the clamping unit 2 can be transmitted between the second transmission device 7 and the first transmission device 6 in a non-contact, optionally inductive or capacitive manner. In any case, the coupling for energy and/or signal transmission between the transmission devices 6, 7 takes place in a non-contact manner via a transmission gap 9. For an inductive coupling, primary, respectively secondary coils disposed in the transmission devices 6, 7 and appropriately aligned and adapted to each other inductively act in pairs.

FIG. 1 shows an embodiment of a transmission arrangement 1 with eccentrically arranged transmission devices 6, 7; i.e. external of the rotary axis D of the rotary table 5, respectively the central axis M of the clamping unit 2. The second transmission device 7 is here attached on the outside of the outer housing 12 on a center housing element 52 above the fastening flange 42 but could also be at least partially integrated into the outer housing 12, respectively be received in it. Upon a rotation of the clamping unit 2, there is at least temporarily a transmission gap 9 between the first and second transmission device 6, 7, via which the coupling, i.e. the energy and/or signal transmission may ensue. The first transmission device 6 is here implemented as a stator externally positioned on the clamping unit's 2 circumference which exhibits a ring segment-shaped section having a circumferential surface 62 adapted to the radius of the outer housing 12, for example. The second transmission device 7 exhibits a circumferential surface 72, with a radial transmission gap 9 extending between the circumferential surfaces 62, 72 which has a width of between 0.1 and 10 mm, preferably between 0.5 and 5 mm, and particularly preferred about 1 mm. A plurality of second transmission devices 7 may be arranged distributed over the clamping unit's 2 circumference, each transmission device 7 being able to transmit the same or different signals or electrical energy for the power supply of the electric motor 16 and/or a rechargeable battery 80.

Figure 2:
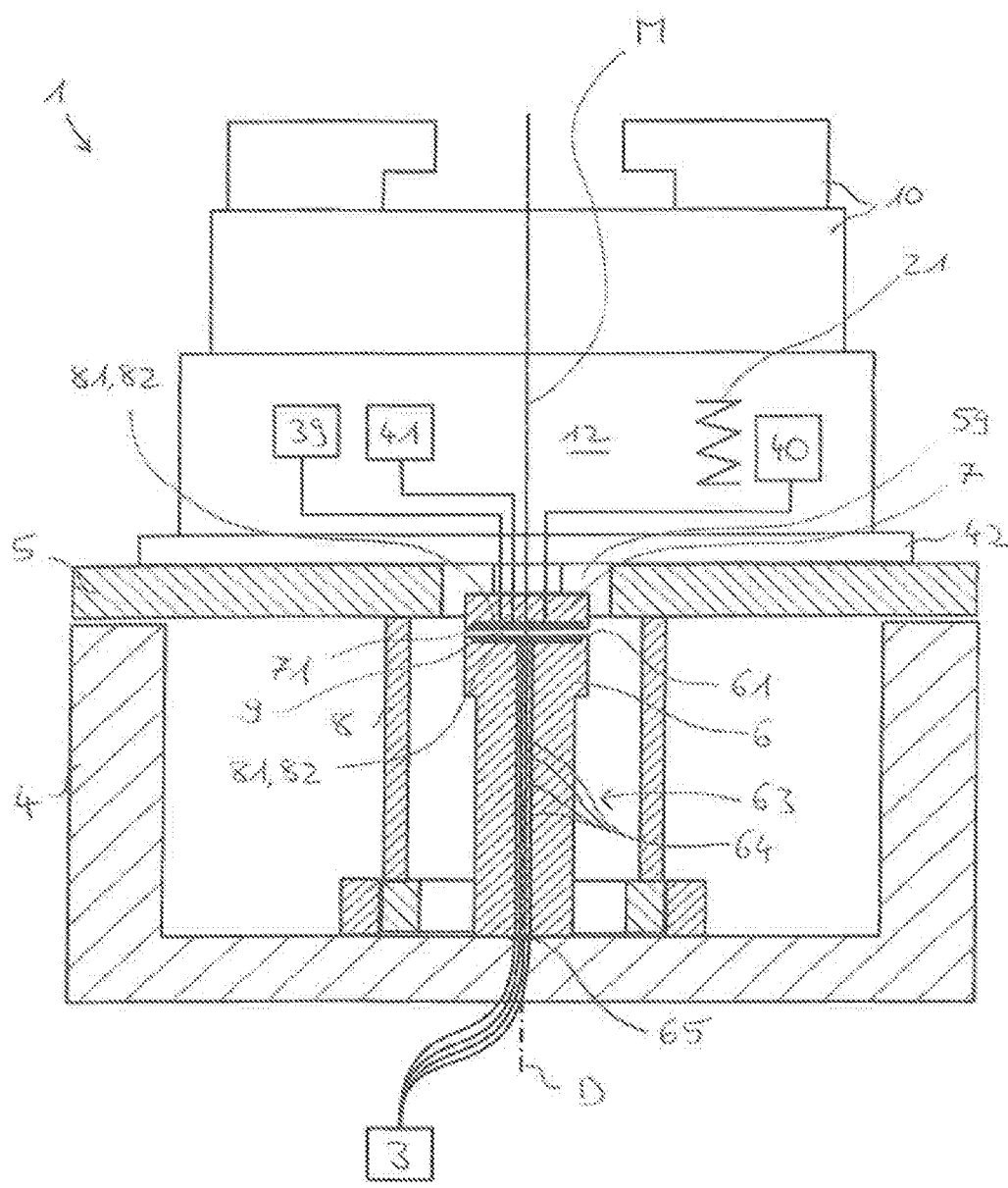
FIG. 2 a second embodiment of the inventive transmission arrangement with a coupling via front surfaces in a schematic representation.

FIG. 2 shows an embodiment of the transmission arrangement 1 in which the first and second transmission devices 6, 7 are arranged to be coaxial but axially offset to the central axis M and the non-contact coupling ensues via front surfaces 61, 71. An axial transmission gap 9 running perpendicular to the rotary axis D, via which the non-contact transmission of electrical energy and/or signals ensues, is formed between the front surfaces 61, 71. A plurality of primary coils 81 and/or secondary coils 82 may in each case be arranged in or respectively behind the front surfaces 62, 72 so that different signals can be transmitted optionally in different directions, for instance by sector or by radial area, via one front surface. The transmission gap 9 may be constructively positioned at arbitrary intervals by adapting the lengths of the first and second transmission devices 6, 7.

It may in particular be displaced up to the lower side of the clamping unit 2, respectively into same, or farther away from the rotary table 5 in the direction of the lower part of the console 4.

The rotary table 5 exhibits a recess 59 into which the second transmission device 7 enters from above. The rotary table 5 is driven by a hollow shaft 8, with an axially extending transmission shaft 63 of the first transmission device 6 protruding into the hollow shaft's 8 interior, respectively being completely received within same. From the front surface 61 of the first transmission device 6, optionally a primary or secondary coil 81, 82, multiple lines 64 for conducting electrical energy and/or sensor signals run to a lower end of the transmission device 6, where the lines are connected to a machine control unit 3 via plug connections 65. The lines are realized as cables or a bus system, for example. The transmission shaft 63 exhibits a smaller circular cross-section than the circular front surface 61, whereby a large transmission area toward the second transmission device 7 and at the same time a thin, respectively compact constructional shape of the transmission arrangement 1 is achieved.

Figure 3:
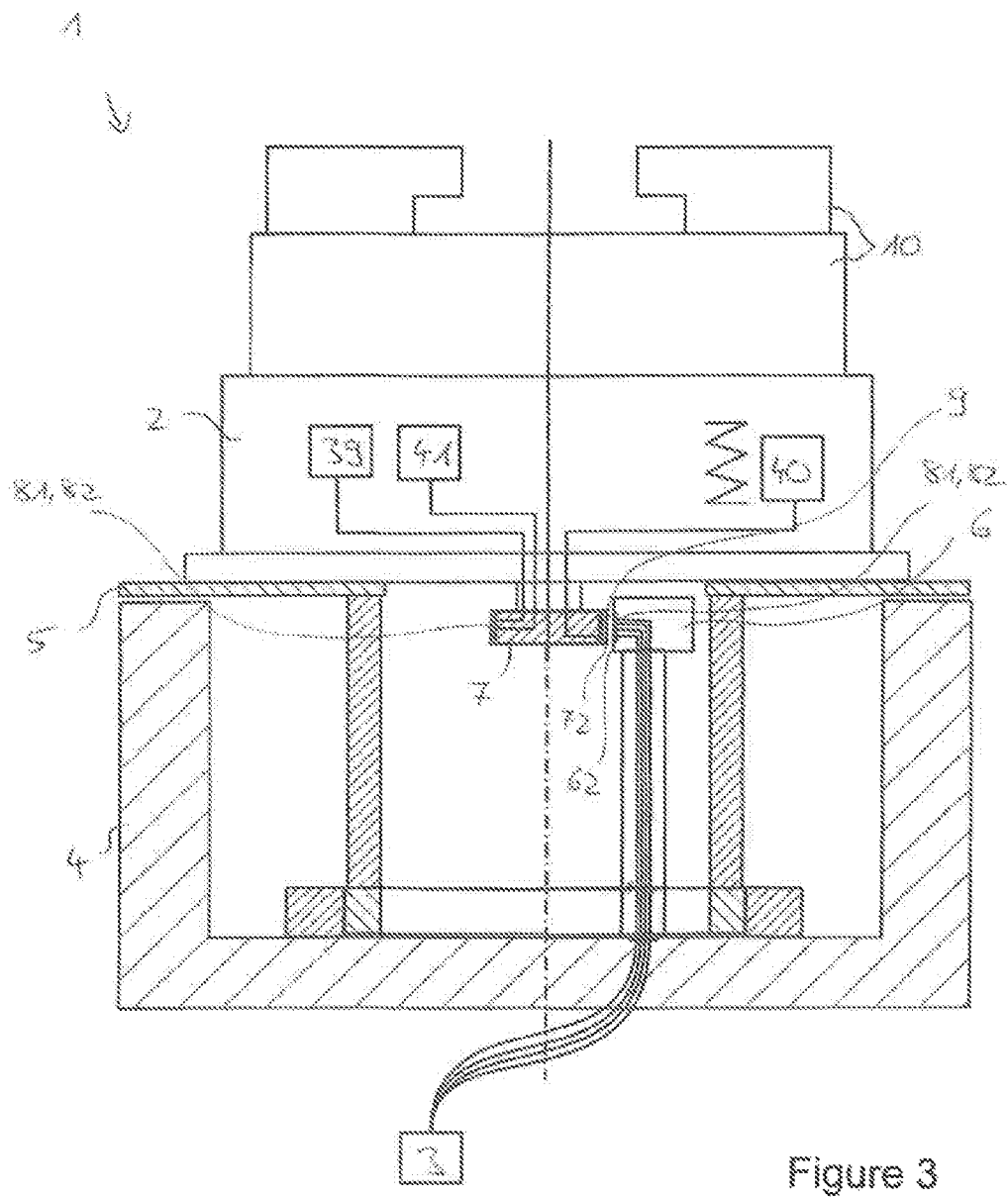
FIG. 3 a third embodiment of the inventive transmission arrangement with a coupling via circumferential surfaces in a schematic representation.

FIG. 3 shows an embodiment of the transmission arrangement 1 in which the first and second transmission devices 6, 7 are arranged coaxial to the rotary axis D, respectively the central axis M, but axially overlapping, respectively partially inside each other and the non-contact coupling ensues via circumferential surfaces 62, 72. The first transmission device 6 here represents an outer transmission device which at least partially receives the second transmission device 7 as an inner transmission device so that a radial transmission gap 9 extending parallel to the rotary axis D is formed between a first circumferential surface 62 and a second circumferential surface 72. Embodiments are also conceivable in which the first transmission device 6 represents an inner transmission device and the second transmission device 7 an outer transmission device, for example due to a realization having a central hollow space such as a hollow cylinder. In addition to the coupling via circumferential surfaces 62, 72, a coupling via front surfaces 61, 71 could also be realized. Due to the axial overlapping of the first and second transmission devices 6, 7, the size of the circumferential surface suitable for the inductive coupling can be adjusted.

Figure 4:
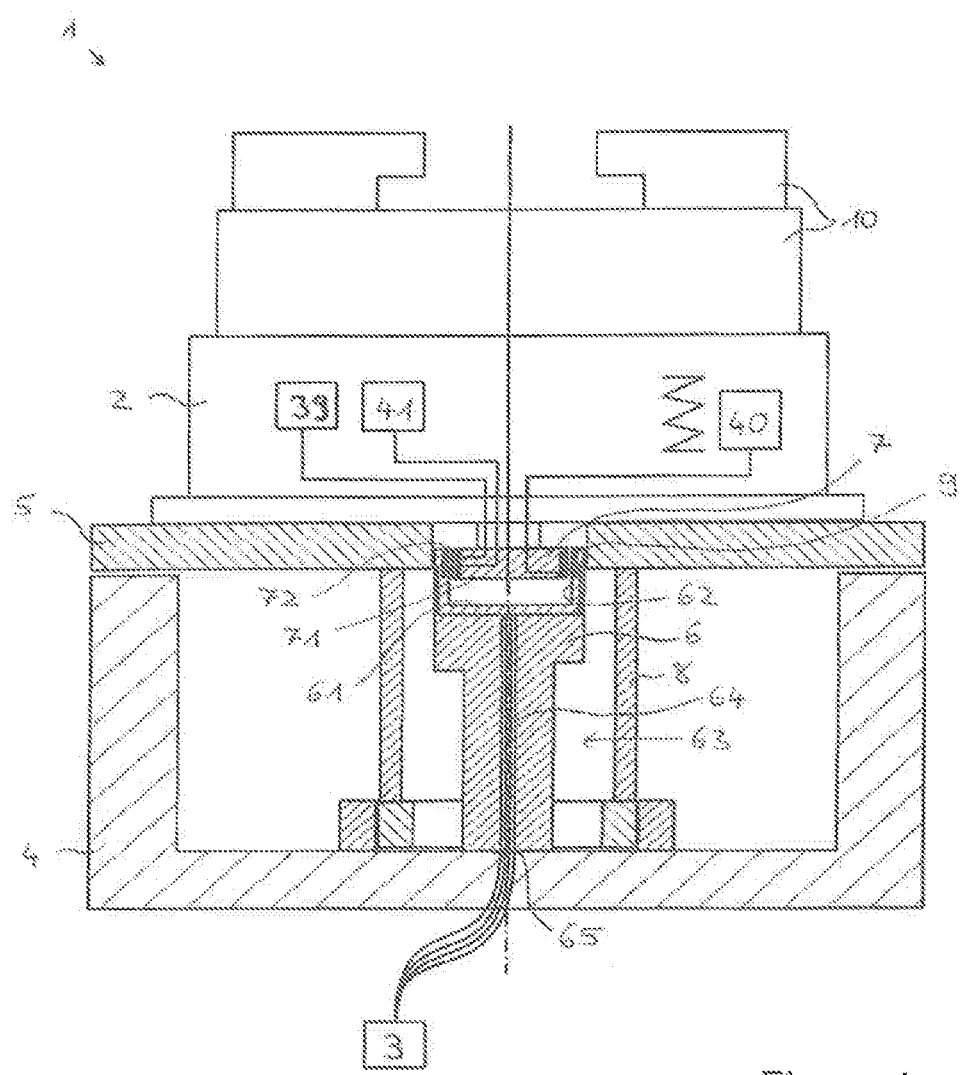
FIG. 4 a fourth embodiment of the inventive transmission arrangement with a centrically arranged second transmission device and an eccentrically arranged first transmission device in a schematic representation.

FIG. 4 shows an arrangement of the first and second transmission devices 6, 7 in which the second transmission device 7 is formed to be of a circular cylindrical shape and arranged coaxial to the clamping unit's 2 central axis M below the lower housing element 52. A first transmission device 6 is arranged eccentric to the rotary axis D, respectively the central axis M, wherein the non-contact, optionally inductive coupling taking place via circumferential surfaces 62, 72 in a similar manner as described with respect to FIG. 1. In contrast to the arrangement in FIG. 1, however, there is a transmission gap 9 of a permanent constant width here so that, depending on the specific arrangement of primary and secondary coils 81, 82 in the transmission devices 6, 7, a continuous transmission of electrical energy and/or signals is possible. The transmission device 6 may be attached inside the console 4 so that the clamping unit's 2 freedom of movement and accessibility is not affected by a static first transmission device 6 appropriately oriented toward the circumferential second transmission device 7 (as in FIG. 1). In addition, the transmission devices 6, 7 are in this way protected, for example from incidental chips or cooling liquid discharged from the working space of the machining center.

Sensor devices 39, 40, 41 are arranged within the clamping unit 2 of the transmission arrangements 1 illustrated in FIGS. 1-4. These sensor devices comprise arresting sensor devices 39, sensor devices 40 for detecting a adjustment position of the inner housing 15 relative to the outer housing 12 or a clamping force exerted by the spring force storage 21, and sensor devices 41 for detecting the number of revolutions of the electric motor 16, an output shaft 20 and/or the gear means 17, 18, 19. The sensor devices 39, 40, 41 each generate corresponding sensor signals which are sent from the sensor devices 39, 40, 41 via a conducting connection, e.g. through corresponding passage openings, to the second transmission device 7. The arresting sensor devices 39 for example generate a lock and unlock signal which is a digital signal of 0 or 24 V, for example. Sensor devices 40 comprise for example a linear position sensor which detects the adjustment position, consequently the relative displacement of the inner housing 15 to the outer housing 12, and sends a corresponding path signal to the second transmission device 7. Additionally or alternatively, a force sensor may be provided in or respectively on the spring force storage 21 so as to detect an actual currently acting clamping force applied by the clamping unit 2 to clamp a workpiece or tool, and to send a force signal to the second transmission device 7. A path signal will generally be dependent on the clamped workpiece, whereas a force signal allows for example a conclusion to be drawn on whether a re-clamping of the workpiece is required, for example because the originally adjusted clamping force on the workpiece has varied during the machining due to vibration or elastic deformation. It is also conceivable to determine, for example in a signal processing unit, a corresponding force signal from a measured path signal based on a known force-spring characteristic of the spring force storage 21 (see FIG. 9). The signals generated by the sensor device 40 are preferably analog measurement signals, for example of between 4 and 20 mA. Sensor devices 41 are also conceivable which detect the number of revolutions of the electric motor 16, respectively the gear means 17, 18, 19, and for example allow conclusions to be drawn about a displacement path covered via known thread pitches. The sensor devices 39, 40, 41 send their sensor signals to a single second transmission device 7 which comprises components for processing the measurement signals. The first transmission device 6 may also exhibit components for evaluating, processing or converting sensor signals. In a preferred embodiment, a digital lock signal, a digital unlock signal as well as an analog force signal are transmitted between the first and second transmission devices 6, 7 from the second transmission device 7 to the first transmission device 6. In addition, a DC voltage, for example of 24 V, e.g. for supplying the sensor devices 39, 40, 41 and/or for driving e.g. the electromagnetic actuator of the actuating device 30 is transmitted from the first transmission device 7 to the second transmission device 7. The signals transmitted in a non-contact manner may be forwarded from the first transmission device 6 to a machine control unit 3 of the machining center, such as the turning and/or milling center, so as to be displayed, monitored or analyzed there, for example.

Figure 5A:
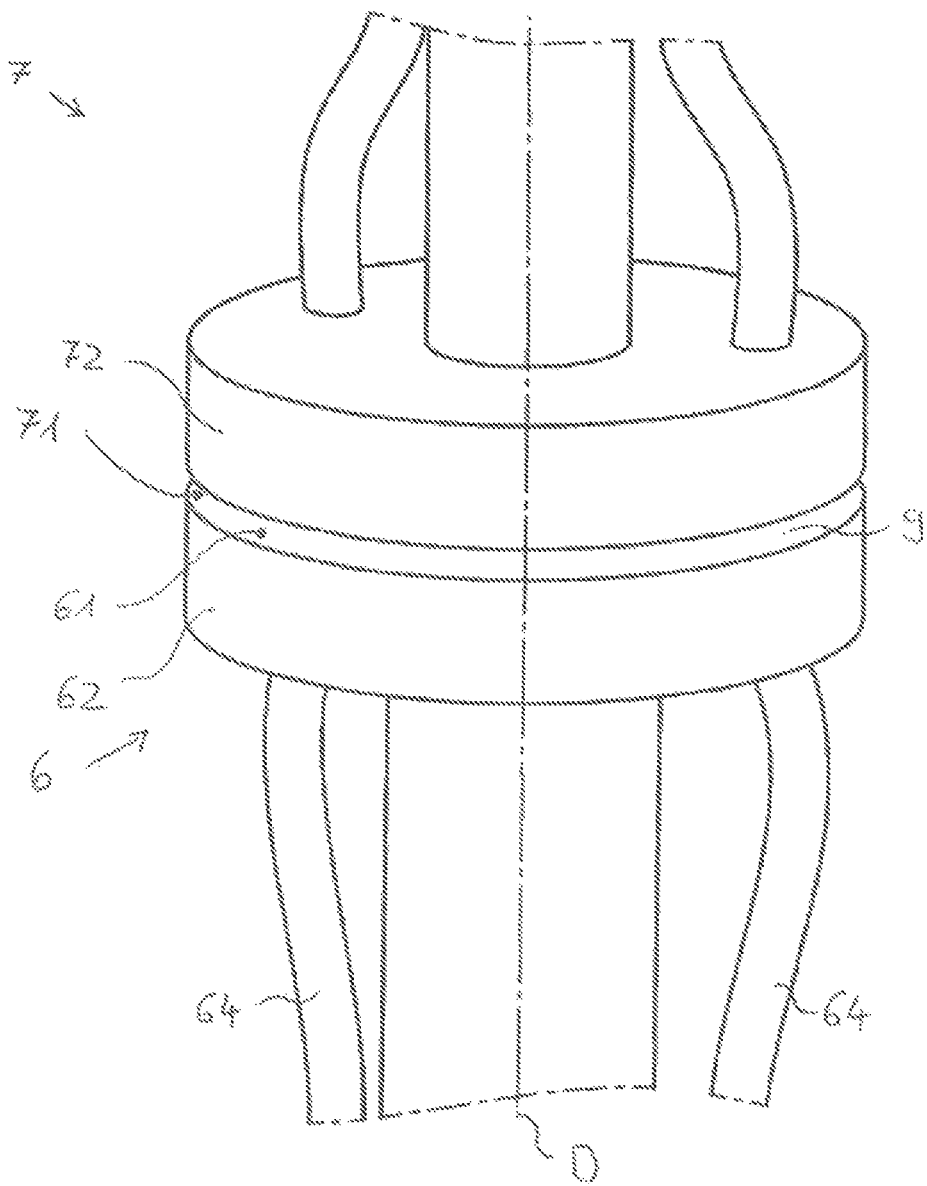
FIG. 5a a detailed view of an embodiment of the first and second transmission devices with a coupling via front surfaces in a schematic representation.

FIG. 5a shows a detailed view of an embodiment of the first and second transmission devices 6, 7 with a coupling via front surfaces 61, 71 as described in conjunction with FIG. 2.

Figure 5B:
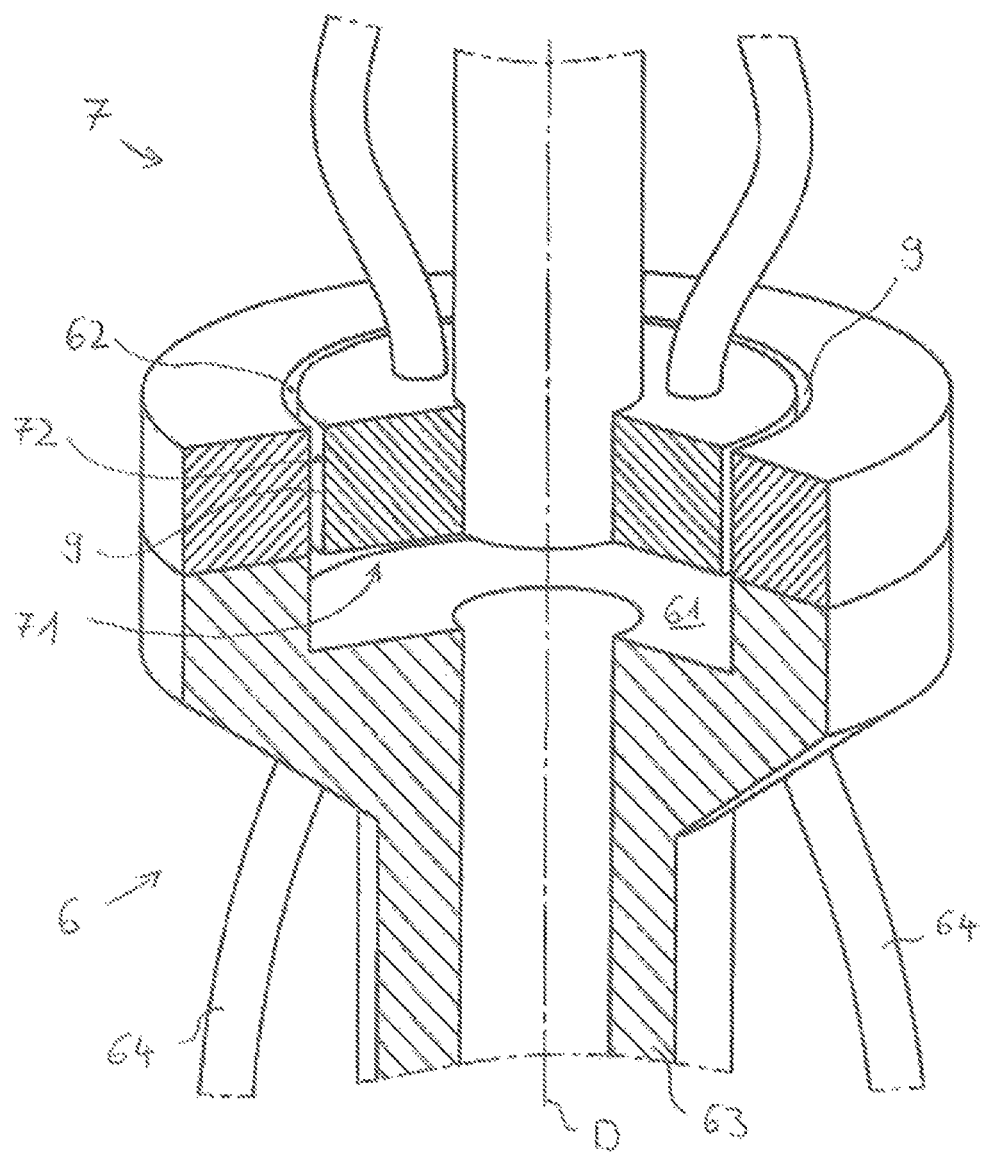
FIG. 5b a detailed view of an embodiment of the first and second transmission devices with a coupling via circumferential surfaces in a schematic representation.

FIG. 5b shows a detailed view of an embodiment of the first and second transmission devices 6, 7 with a coupling via circumferential surfaces 62, 72 as described in conjunction with FIG. 4. Lines 64 run here outside the transmission shaft 63.

Figure 5C:
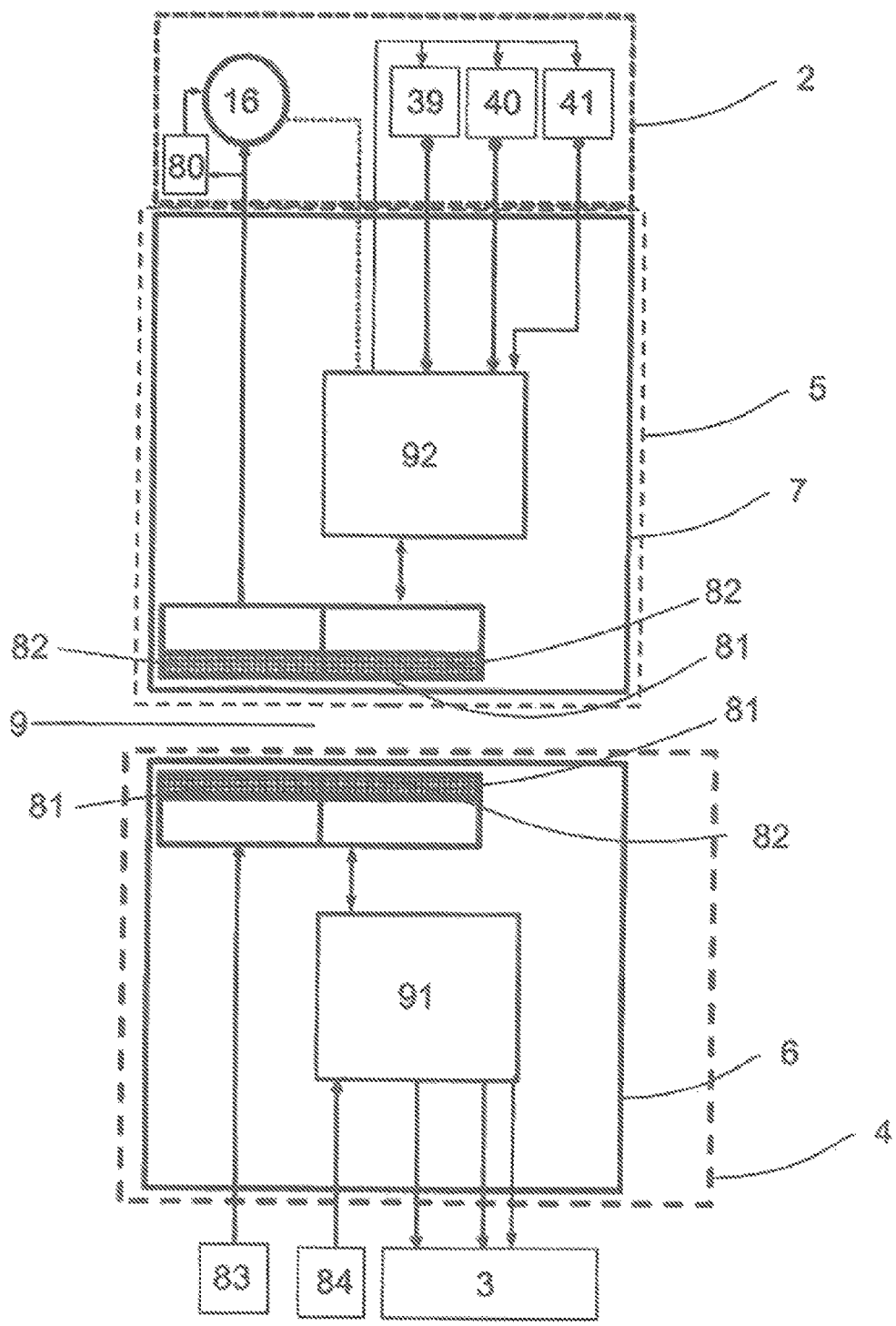
FIG. 5c a schematic representation of an embodiment of the inventive transmission arrangement in a block diagram.

In FIG. 5c, an embodiment of the inventive transmission arrangement is illustrated in a block diagram. As described above with reference to FIGS. 1 to 5b, energy and sensor signals are transmitted in a non-contact, optionally inductive manner between the first transmission device 6 and the second transmission device 7. The first transmission device 6 is stationary relative to the console 4, whereas the second transmission device 7 is fixedly connected to the rotary table 5 and the clamping unit 2 and rotates relative to the first transmission device 6. Electrical energy is conducted from a power supply 83 to a primary coil 81 of the first transmission device 6 and transmitted in a non-contact manner via the transmission gap 9 to a secondary coil 82 of the second transmission device 7. From there, the energy is conducted into the clamping unit to supply the rechargeable battery 80, preferably a lithium ion battery, and/or the electric motor 16. The electric motor, which is preferably implemented as a direct current motor, may in this way be supplied with a voltage of 48 to 150 V, and, may provide a clamping power of for example 4 kW, or even more under certain circumstances.

Energy, preferably a voltage of 24V, to supply the processing units 91, 92 of the sensor device 39, 40, 41 and/or to switch the arresting device 28 comprising for example an actuating device 30 based on an electromagnet, is transmitted in a non-contact manner from a preferably separate power supply 84 via primary and secondary coils 81, 82 from the first transmission device 6 to the second transmission device. Generated sensor signals are transmitted in a non-contact manner from the sensor devices 39, 40, 41 in the reverse direction, consequently from the second transmission device 7 to the first transmission device 6, with the second processing unit 92, which is optionally implemented as a logic processing unit for processing sensor signals, converting the input sensor signals into serial sensor signals which can be transmitted in a non-contact manner via the transmission gap 9. The first processing unit 91, which is optionally implemented as a logic processing unit for processing sensor signals, again generates sensor signals from the transmitted serial signals which are forwarded to the machine control unit 3. Sensor signals may respectively be digital or analog of either 0 to 10 V or 4 to 20 mA, and optionally configured as incremental signals, for example. The electric motor 16 may be connected to the second processing unit 92 in a signal-conducting manner.

Figure 6:
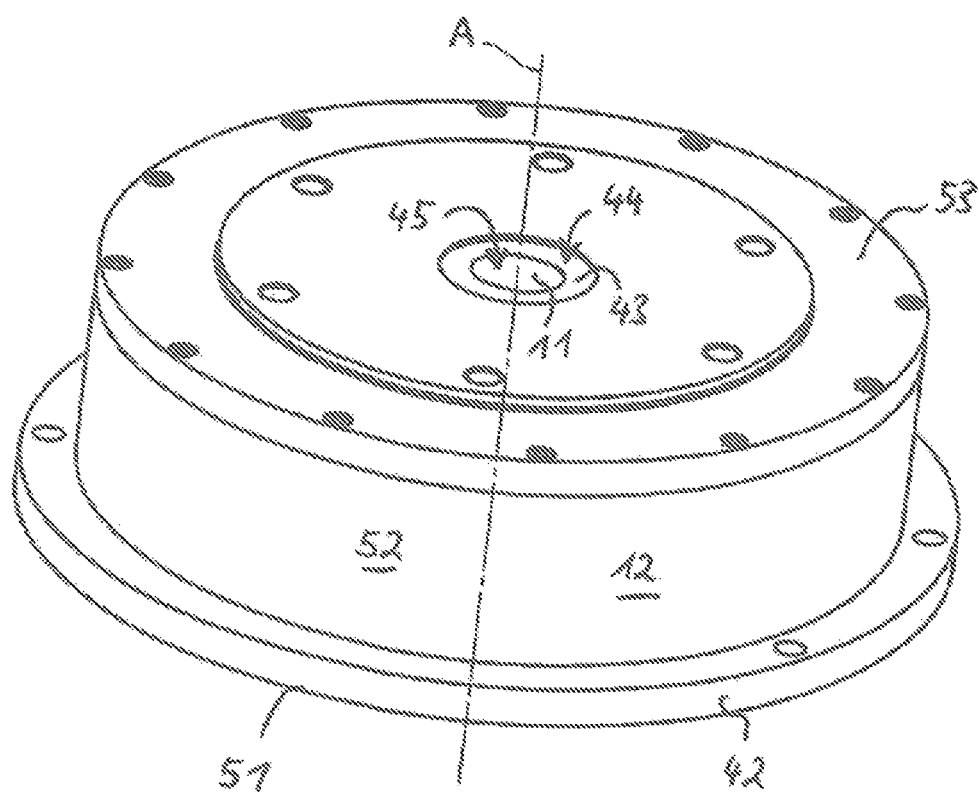
FIG. 6 an embodiment of the inventive clamping unit in a perspective view.

FIG. 6 illustrates a perspective view of an embodiment of an inventive clamping unit. The clamping unit firstly comprises an outer housing 12 composed of a lower outer housing element 51, a center outer housing element 52 and an upper outer housing element 53. The lower outer housing element 51 forms a fastening flange 42 at its underside. An upper neck portion 43 of an inner housing 15 protrudes at the upper outer housing 53 into an opening 44 of the upper housing element 53, respectively the outer housing 12. The neck portion 43 of the inner housing 15 likewise defines an opening 45 of a substantially elliptical cross-sectional shape. An inner cylinder 11 is guided into this opening 45 which likewise exhibits an elliptical cross-sectional shape at its distal upper portion adapted to the elliptical shape of the opening 45.

Figure 7:
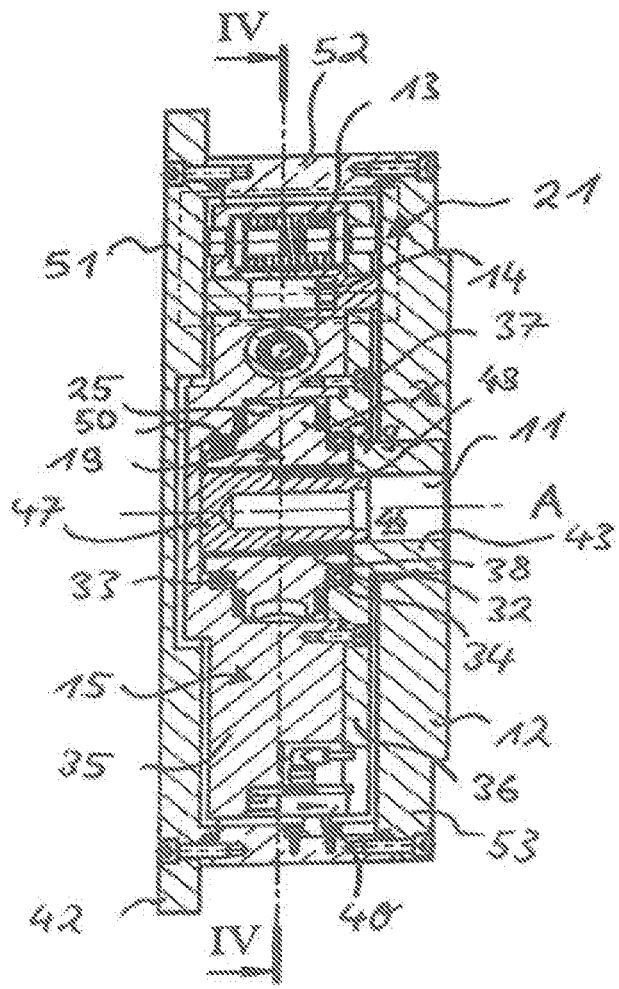
FIG. 7 an embodiment of the inventive clamping unit according to FIG. 6 in a sectional view.

A sectional view of the embodiment in FIG. 6 is illustrated in FIG. 7. It becomes apparent from this sectional view how the inner housing 15 is received within the outer housing 12. It is specifically supported via springs 13, 14 of different constructional design, namely specifically via a plurality of spiral springs 13 as well as a plurality of gas pressure springs 14 on the outer housing 12 such that the inner housing is displaceably mounted in the adjustment position A, however in each case against the counterforce provided by the springs 13, 14. The displaceable mounting of the inner housing 15 in the outer housing 12 while overcoming the counterforce provided by the springs 13, 14 defines a spring force storage.

Guides may be provided to guide the inner housing 15 within the outer housing 12 along displacement direction A, wherein the guide in the present embodiment is defined by the previously cited neck portion 43 inside the opening 44 of the outer housing 12.

The previously cited inner cylinder 11, which is configured to be displaceable in the displacement direction A, is mounted inside the inner housing 15. The inner cylinder 11 is of multi-part configuration in the present embodiment and has a first, upper portion 46 and a second, lower portion 47.

The inner cylinder 11 is shaped at the first, upper portion 46 with the previously cited elliptical cross-section. The second, lower portion 47 of the clamping cylinder, however, has a circular cross-section and an external thread 48 at least in some sections on its outer circumference. First portion 46 and second portion 49 can be interconnected in a releasable manner, e.g. via a screw connection or in any other appropriate way. Alternatively, it is also possible to implement the first, upper portion 46 and the second, lower portion 47 to be integrally connected to each other.

The external thread 48 provided on the second, lower portion 47 engages in a correspondingly shaped internal thread 38 of a worm wheel 25 which in this respect constitutes a first partial element of a sleeve screw drive 19. The second, lower portion 47 provided with the external thread 48 accordingly constitutes a second partial element corresponding to the first partial element of the sleeve screw drive 19. On its outer circumference, the worm wheel 25 has a worm toothing cooperating with a worm 24 of a worm gear 18. In order to stabilize the worm wheel 25 in the axial and radial direction within the inner housing 15, the worm wheel 25 has an upper bearing surface 32 as well as a lower bearing surface 33 via which it is supported on corresponding bearing surfaces 49, 50 of the inner housing 15 via balls 34.

It becomes apparent from the sectional view according to FIG. 7 that the inner housing 14 is of multi-part configuration, namely specifically comprises a basic housing element 35 as well as a housing cover 36, with the basic housing element 35 and housing cover 36 being connected together via connecting elements 37 such as connecting screws. This construction guarantees the ease of mounting the clamping unit. That is to say that the various single components such as the worm wheel 25 provided with the inner cylinder 11, the springs 13, 14, as well as the other components described in more detail with respect to FIG. 8, such as the rechargeable battery 80 and the sensor devices 39, 40, 41, can be inserted into the basic housing element 35 in the mounting process and already be at least partially fixed by the fixing of the housing cover 36, such as e.g. at least the springs 13, 14 and the worm wheel 25.

Figure 8:
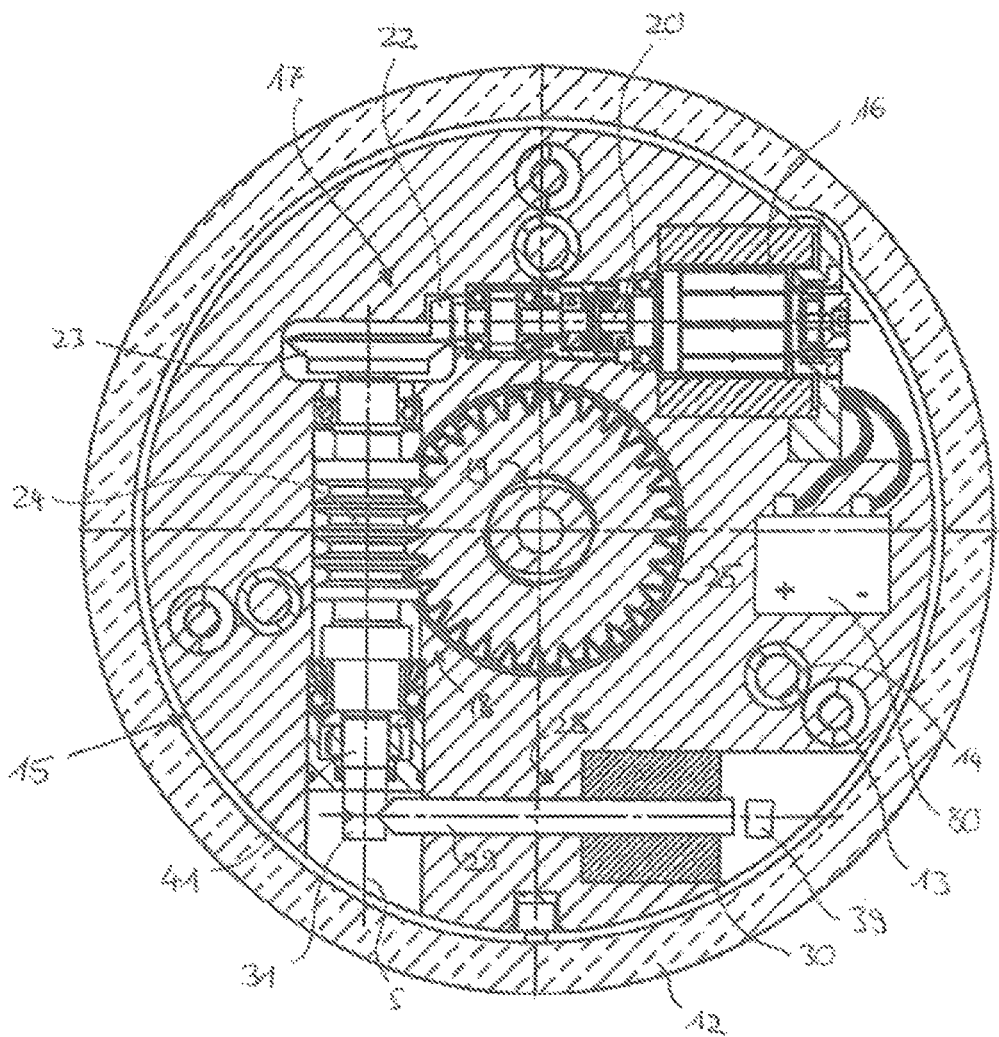
FIG. 8 an embodiment of the inventive clamping unit according to FIG. 6 including a rechargeable battery in a sectional view along Line IV-IV from FIG. 6.

FIG. 8 shows an embodiment of the inventive clamping unit 2 in a sectional view with a rechargeable battery 80. The rechargeable battery 80 such as a lithium ion battery is received within the clamping unit 2 and electroconductively connected to the electric motor 16. The rechargeable battery 80 can be charged or discharged in a non contact, optionally inductive manner via first and second transmission devices 6, 7, e.g. during a rotating clamping unit 2. For charging/discharging, the rechargeable battery 80 is connected to the second transmission device 7 via cables or a circuit board. With the help of the rechargeable battery 80, the clamping unit 2 may even perform clamping operations at high power consumption if, for example, the inductively transmitted power is not sufficient to drive the electric motor 16 so as to achieve a desired high clamping force within a reasonable period of time. The electrical energy stored in the rechargeable battery 80 may in this case supplement the electrical power transmitted inductively from the first transmission device 6 to the second transmission device 7 for driving the electric motor 16 so as to provide a specific required electrical power to the electric motor 16.

Referring to FIG. 8, it will become apparent that an electric motor 16 is arranged in the inner housing 15 which transfers a rotary movement to a pinion gear 17 via an output shaft 17. The pinion gear 17 comprises a toothed wheel 22 on the motor side as well as a toothed wheel 23 on the output side which is connected to the worm 24 of the worm gear 18 in a torque-locked manner. The worm 24 engages the previously cited worm wheel 25 and sets it into a rotary movement when the electric motor 16 is actuated. The worm 24 may be configured so as to act in a self-locking manner, i.e. preventing a rotary movement even with an axial force being transmitted from the inner cylinder 11 to the sleeve screw drive 19. As an alternative or in addition, however, an arresting device 28 with an electromagnetically operating actuating device 30 in this case may also be provided. An axially displaceable pin 29 is mounted in the actuating device 30 which can be conveyed along its longitudinal axis from the blocking position, respectively locking position shown in FIG. 8 into a retracted position, respectively unlocking position and vice versa. In the blocking position shown in FIG. 8, the axially displaceable pin 29 engages in a recess in a shaft extension 31 which is connected to the worm 24 in a torque-locked manner, and thus blocks the gear means 17 to 19, especially the worm 24.

Arresting sensor devices 39 are moreover provided by means of which can be identified whether the axially displaceable pin 29 is in the locking position or in the retracted position.

A clamping operation will now be described below, wherein a clamping operation should be understood both as an axial displacing of the inner cylinder 11 in the adjustment direction A, respectively opposite to the adjustment direction A, and a displacing of the inner housing 15 under the action of the springs 13, 14 for generating a spring force stored in the thus defined spring force storage 21: When the electric motor 16 is set into rotary motion, the output shaft 20 drives, via the pinion gear 17, the worm 24 of the worm gear 18 which transmits its rotary motion to the worm wheel 25 and thus to the sleeve screw drive 19. Due to the first partial element of the sleeve screw drive 19 rotating relative to the second partial element of the sleeve screw drive 19, the inner cylinder 11 is axially offset, for example in a direction out of the outer housing 12. If the inner cylinder 11 encounters a counterforce, for example when the clamping unit interacts with a chuck 10 placed on top, and a workpiece already rests against clamping jaws of the chuck 10, further acting upon the inner cylinder 11 causes the force clamping the workpiece to increase. A further application of force upon the inner cylinder 11 toward the outside of the inner housing 15 then causes the inner housing 15 to displace in the opposite direction within the outer housing 12 against the action of the springs 13, 14, thus creating a counterforce in the spring force storage 21. The inner housing's 15 displacement path relative to the outer housing 12, and thus indirectly also the counterforce resulting in the spring force storage 21, can be detected via sensor devices 40. When a desired force value is reached, the electric motor 16 is stopped and the gear means 17 to 19 are blocked either by a self-locking dictated by the worm 24 and/or by the previously cited arresting means 28, 29.

In order to detect the rotary movement of the electric motor 16, the output shaft 20 or the gear means 17 to 19, sensor devices 41 may be provided which detect, for example complete revolutions via an appropriate sensor system e.g. by utilizing the Hall effect.

Figure 9:
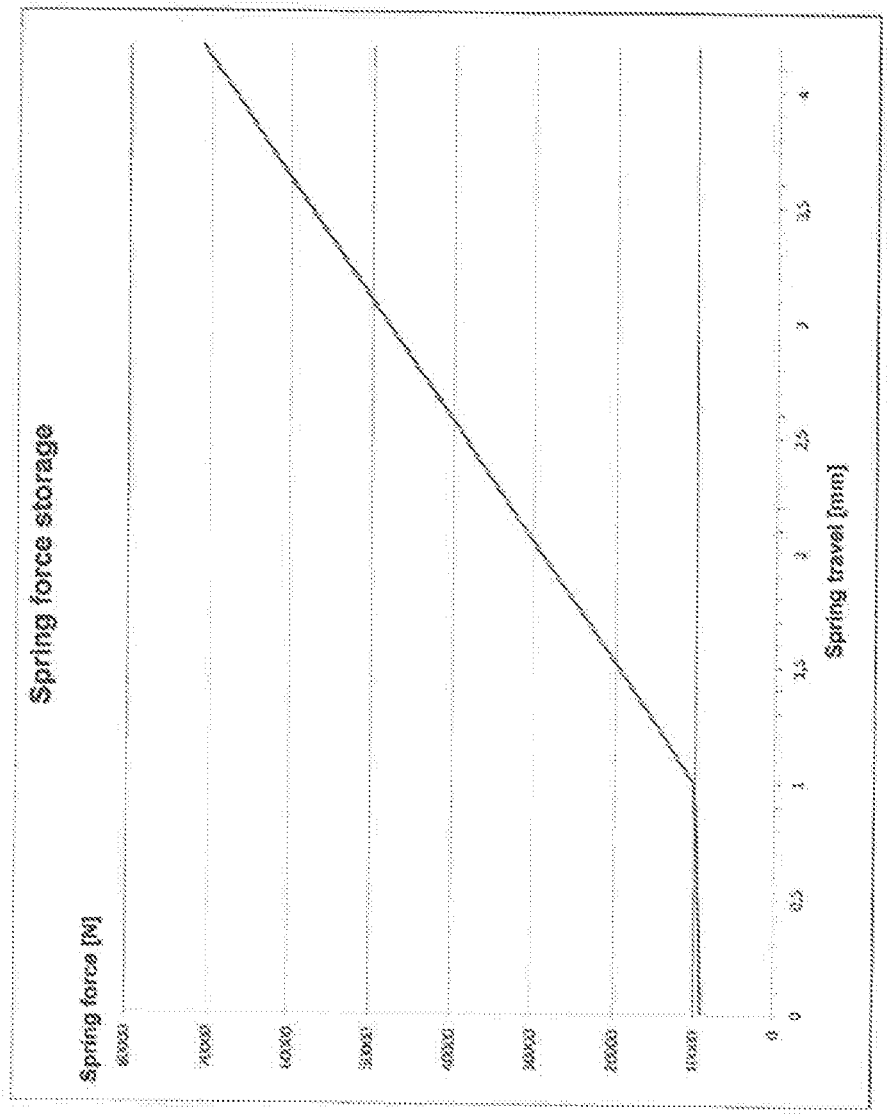
FIG. 9 a spring characteristic diagram illustrating the inventive spring force storage, the parallel effective, differently designed springs of which overlap in terms of their spring characteristics.

It is illustrated with reference to FIG. 9 how the spring characteristics of the various springs 13, 14 of different constructional design overlap such that a relatively large counterforce is already provided at a small adjustment path, this being preponderantly due in the case of small adjustment paths to the gas pressure spring. In the case of longer adjustment paths, the spiral springs then play their part such that a considerably increasing spring force results as of a certain spring deflection. It goes without saying that a desired spring characteristic can be set to a large extent by appropriately combining the spring characteristics of gas pressure springs and spiral springs.

An inventive transmission arrangement 1 has the advantage that large freedom of movement is possible in machining a workpiece especially while a clamping unit 2 is rotating. In addition, monitoring and controlling the clamping unit 2 by the non-contact signal transmission are possible even during a machining operation, whereby the operational safety and machining precision are increased. Furthermore, the inventive arrangement of first and second transmission devices 6, 7 guarantees good accessibility and simple operability of the clamping unit 2 in clamping a workpiece or tool.

What is claimed is:

1. A transmission arrangement for at least one of electrical energy and signals comprising:
    a clamping unit comprising an outer housing, an inner housing received within the outer housing, and an inner cylinder held within the inner housing to be adjustable in an actuating direction A, said inner cylinder being configured to transmit a compressive or tensile force for clamping purposes,
    wherein the inner housing is supported against the outer housing via a plurality of springs and is displaceably mounted in the actuating direction A with respect to the outer housing and thus forms a spring force storage,
    wherein an electric motor is arranged integrated within the clamping unit to apply force in the actuating direction A to the inner cylinder via an intermediate gear;
    a console having a rotary table mounted therein to be rotatable;
    at least one first transmission device connected to the console; and
    at least one second transmission device connected to the clamping unit,
    wherein the clamping unit is releasably fastened on the rotary table, and the first and second transmission devices are configured to transmit the at least one of electrical energy and signals for driving the electric motor in a non-contact manner between the at least one first transmission device and the at least one second transmission device, and
    wherein the rotary table comprises a recess into which the second transmission device enters from above, wherein the rotary table is driven by a hollow shaft with an axially extending transmission shaft of the first transmission device protruding into an interior of the hollow shaft.

2. The transmission arrangement of claim 1, wherein the clamping unit comprises sensor devices and the at least one first and second transmission devices are configured to transmit signals generated by the sensor devices in the non-contact manner between the at least one first transmission device and the at least one second transmission device.

3. The transmission arrangement according to claim 2, wherein the sensor devices and the at least one second transmission device are connected to each other in a signal-conducting manner.

4. The transmission arrangement of claim 2, wherein the sensor devices comprise at least one of an arresting sensor, wherein the arresting sensor is configured to check whether an arresting device is in locking position and to send a corresponding lock or unlock signal to the at least one second transmission device, and one or more sensor devices configured to detect at least one of an adjustment position of the inner housing within the outer housing and a counterforce stored in the spring force storage, and to send at least one of a corresponding path and a force signal to the at least one second transmission device, and one or more sensor devices configured to detect a rotary movement of at least one of the electric motor, an output shaft and the intermediate gear, and to send a corresponding speed signal to the at least one second transmission device.

5. The transmission arrangement of claim 1, wherein a rechargeable battery is integrated within the clamping unit and the at least one first and second transmission devices are configured to transmit electrical energy for at least one of charging and discharging the rechargeable battery in the non-contact manner between the at least one first transmission device and the at least one second transmission device.

6. The transmission arrangement of claim 5, wherein a single first transmission device and a single second transmission device transmit at least one of electrical energy for driving the electric motor, electrical energy for at least one of charging and discharging the rechargeable battery, and at least one sensor signal.

7. The transmission arrangement of claim 5, wherein the non-contact manner is an inductive manner.

8. The transmission arrangement of claim 1, wherein the at least one first and second transmission devices comprise a primary and secondary coil cooperating in pairs with the respective secondary and primary coil of the corresponding transmission device, to inductively transmit at least one of
    electrical energy from the at least one first transmission device to the at least one second transmission device, and
    sensor signals from the at least one second transmission to the at least one first transmission device, the sensor signals comprising at least one of a locking, unlocking, force, path, and speed signal.

9. The transmission arrangement of claim 1, wherein the at least one second transmission device is arranged on the clamping unit coaxial to a central axis of the clamping unit.

10. The transmission arrangement of claim 1, wherein the at least one first transmission device and the at least one second transmission device have circular or annular front surfaces between which a transmission gap is formed.

11. The transmission arrangement according to claim 10, wherein the width of the transmission gap is between 0.1 mm and 10 mm.

12. The transmission arrangement of claim 1, wherein the at least one first transmission device and the at least one second transmission device have circumferential surfaces.

13. The transmission arrangement of claim 1, wherein at least one of the at least one first and second transmission devices has a rotation-symmetrical, cylindrical basic shape.

14. The transmission arrangement of claim 1, wherein the at least one first transmission device has an axially extending transmission shaft in which a plurality of lines for guiding at least one of electrical energy and sensor signals are arranged.

15. The transmission arrangement of claim 1, wherein the rotary table is driven by a hollow shaft into which the at least one first transmission device protrudes.

16. The transmission arrangement according to claim 1, wherein the inner housing is supported against the outer housing via the plurality of springs, a first spring of the plurality of springs comprises a first constructional design and a second spring of the plurality of springs comprises a second constructional design.

17. The transmission arrangement of claim 1, further comprising an arresting device capable of arresting the intermediate gear if required.

18. The transmission arrangement of claim 1, wherein the non-contact manner is an inductive manner.

19. The transmission arrangement of claim 1, wherein the axially extending transmission shaft of the first transmission device is completely received within the interior of the hollow shaft.

* * * * *